United States Patent
St-Pierre et al.

(10) Patent No.: US 10,930,072 B1
(45) Date of Patent: Feb. 23, 2021

(54) MULTI-RESOLUTION MESH REAL-TIME CONTOURING

(71) Applicant: Bentley Systems, Incorporated, Exton, PA (US)

(72) Inventors: Mathieu St-Pierre, Ste-Brigitte de Laval (CA); Elenie Godzaridis, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 16/679,972

(22) Filed: Nov. 11, 2019

(51) Int. Cl.
*G06T 17/20* (2006.01)
*G06T 17/00* (2006.01)

(52) U.S. Cl.
CPC .......... *G06T 17/205* (2013.01); *G06T 17/005* (2013.01)

(58) Field of Classification Search
CPC ..... G06T 17/205; G06T 15/30; G06T 17/005; G06F 30/23
See application file for complete search history.

(56) References Cited

U.S. PATENT DOCUMENTS

| | | | |
|---|---|---|---|
| 2005/0200633 A1 | 9/2005 | Schimmel | |
| 2006/0290695 A1* | 12/2006 | Salomie | G06T 17/20 345/420 |
| 2017/0076456 A1 | 3/2017 | Goodman | |
| 2017/0365094 A1* | 12/2017 | Liu | G06T 7/62 |

OTHER PUBLICATIONS

"3DRehaper Beginner's Guide," Beginner's Guide, Technodigit, Jul. 2, 2018, pp. 1-175.
"3Dsurvey: Mapping and Aerial Image Processing Software," User Manual, vol. 2.7.0, 3Dsurvey, Jun. 1, 2018, pp. 1-110.
"Deriving Contour Lines from a Surface," ArcMap, Esri, <https://desktop.arcgis.com/en/arcmap/10.3/guide-books/extensions/3d-analyst/how-to-derive-contour-lines-from-a-surface.htm>, Jul. 3, 2018, one page.
"Global Mapper User's Manual," Global Mapper v14.0, Global Mapper, Aug. 11, 2013, pp. 1-395.
"How to Generate Contours in ArcGIS for Desktop," MD DoIT GIO, Department of Information Technology, Jan. 9, 2019, pp. 1-13.
"How to Generate the Contour Lines," Pix4D, <https://support.pix4d.com/hc/en-us/articles/202560639-How-to-generate-the-Contour-Lines>, Feb. 2, 2019, pp. 1-2.
"Pix4Dmapper 4.1 User Manual," Pix4D, Pix4D SA, Jan. 8, 2018, pp. 1-305.

(Continued)

*Primary Examiner* — Chong Wu
(74) *Attorney, Agent, or Firm* — Cesari and McKenna, LLP; James A. Blanchette

(57) ABSTRACT

In an example embodiment, techniques are provided for displaying contour lines on a multi-resolution mesh substantially in real-time. Contour lines may be computed on a per-tile basis, scaling for various resolutions. The mesh and computed contour lines from lower resolution tiles may be displayed as temporary (referred to hereinafter as "overview") data while the mesh and contour lines for higher resolution tiles are obtained or computed, to enable substantially real-time update. The techniques may handle very large meshes and large numbers of contour lines, without unduly taxing hardware resources. The techniques may also be applicable to multiple types of meshes (e.g., 2-D, 2.5-D, 3-D, 4-D, etc.).

20 Claims, 12 Drawing Sheets

(56) References Cited

OTHER PUBLICATIONS

"Polylines," 3DReshaper, Technodigit, Hexagon, <https://www.3dreshaper.com/en/software-en/3dreshaper-en/polylines>, Dec. 31, 2015, one page.
"Scalable Terrain Model [STM]," Bentley Communities, Bentley Systems, Incorporated, <https://communities.bentley.com/products/3d_imaging_and_point_cloud_software/w/wiki/24963/scalable-terrain-model-stm>, Nov. 2, 2015, pp. 1-5.
"Using Terrain Model Elements," Bentley Systems, Incorporated, Dec. 17, 2019, pp. 1-2.
U.S. Appl. No. 16/440,178, filed Jun. 13, 2019 by Elenie Godzaridis et al. for Locking of Spatial Regions of Large-Scale Fully-Connected Multi-Dimensional Spatial Data for Collaborative Updating, pp. 1-34.
U.S. Appl. No. 16/514,585, filed Jul. 17, 2019 by Elenie Godzaridis et al. for Techniques for Concurrently Editing Fully Connected Large-Scale Multi-Dimensional Spatial Data, pp. 1-35.
U.S. Appl. No. 16/680,034, filed Nov. 11, 2019 by Elenie Godzaridis et al. for Multi-Resolution Surface Clipping With Asynchronous Incremental On-Demand Marking of Spatial Index Nodes, pp. 1-26.
U.S. Appl. No. 16/680,081, filed Nov. 11, 2019 by Mathieu St-Pierre et al. Mesh Smoothing for Visual Quality and Analysis Improvement, pp. 1-38.

\* cited by examiner

MULTI-RESOLUTION MESH REAL-TIME CONTOURING

BACKGROUND

Technical Field

The present disclosure relates generally to techniques for displaying a mesh, and more specifically to techniques for displaying contour lines on a multi-resolution mesh.

Background Information

A number of types of software applications may generate a multi-dimensional mesh (e.g., a two-dimension (2-D), two-and-a-half-dimensional (2.5-D), three-dimensional (3-D), four-dimensional (4-D), etc. mesh) that represents a portion of the physical environment (e.g., one or more objects, structures, terrain, etc.). Such a multi-dimensional mesh (hereinafter referred to simply as a "mesh") may be a multi-resolution mesh, which includes multiple levels of detail (LOD).

One type of software application that may generate a mesh is a structure from motion (SfM) photogrammetry application, such as the ContextCapture™ application available from Bentley Systems, Inc. A SfM photogrammetry application may operate to generate a mesh composed of faces (e.g., triangles) formed from vertices connected by edges. The mesh may be generated based on a set of images (e.g., photographs), point cloud or other representations of the real-world captured by one or more cameras, scanners, etc. The generating often includes reconstruction, texturing and annotation, and retouching. Reconstruction may involve several stages, including a draft reconstruction stage, a refinement stage, and a simplification stage. Texturing and annotation may include a texturing stage and a pixel-level mapping stage. Retouching may include editing geometry and textures to correct visual artifacts and improve visual quality.

After a mesh (e.g., a multi-resolution mesh) has been generated it may be displayed in a graphical user interface (GUI) of the SfM photogrammetry application or another application for use in planning, analysis or other tasks. When displaying a mesh it is sometime useful to show contour lines to aid in the perception of elevation or height changes. A contour line is a line connecting points arranged at an equal elevation or height. While contour lines originated with 2D maps, contour lines are useful in perceiving representations in other dimension, including 2.5-D, 3-D and 4-D, etc.

Various techniques have been utilized to add contour lines to meshes. However, such existing techniques have generally suffered a number of shortcomings. Determining contour lines for very large meshes and/or when there are large numbers of contour lines can be very resource intensive (e.g., in terms of processing and memory resources), taxing the hardware capabilities of many computing devices. As a result, there may be limitations on the size of meshes that can be contoured or the number of contour lines that may be added. Further, existing techniques typically compute all contour lines before updating the view of the mesh. Given the resource intensive nature of these computations, there may be a significant latency between a user requesting contour lines be added and the contour lines being displayed; there is typically no real-time update to the display. Still further, existing techniques often are not fully scalable such that they do not handle, or well-handle, multi-resolution meshes, and are often limited to one type of mesh (e.g., only 2.5D meshes).

Accordingly, there is a need for improved techniques for displaying contour lines on a multi-resolution mesh that may address some or all of these shortcomings.

SUMMARY

In various embodiments, techniques are provided for displaying contour lines on a multi-resolution mesh substantially in real-time. Contour lines may be computed on a per-tile basis, scaling for various resolutions. The mesh and computed contour lines from lower resolution tiles may be displayed as temporary (referred to hereinafter as "overview") data while the mesh and contour lines for higher resolution tiles are obtained or computed, to enable substantially real-time update. The techniques may handle very large meshes and large numbers of contour lines, without unduly taxing hardware resources. The techniques may also be applicable to multiple types of meshes (e.g., 2-D, 2.5-D, 3-D, 4-D, etc.).

In one example embodiment, one or more software processes executing on one or more computing devices determine tiles required for a region visible in a current view of a multi-resolution mesh. When one or more of the required tiles are available in a local cache but are missing contour lines, the software processes request computation of the missing contour lines for the tile(s) with missing contour lines and access lower resolution contour lines that fall within an area covered by the tile(s) with missing contour lines from a lower resolution tile available in the local cache. The lower resolution contour lines are displayed on the tile(s) with missing contour lines while the missing contour lines are being computed in background.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 1:
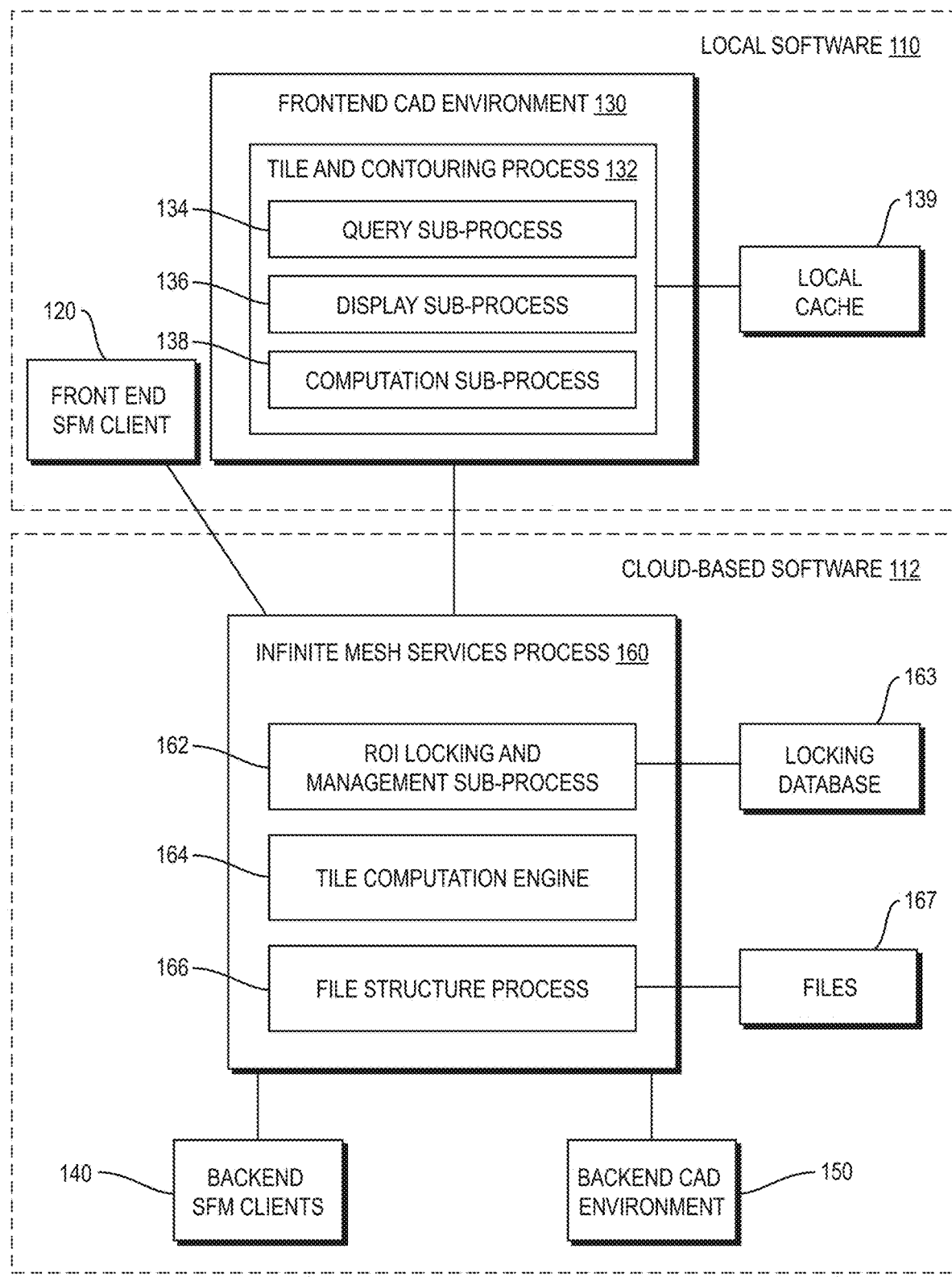
FIG. 1 is a high-level block diagram of an example software architecture that includes a computer aided design (CAD) environment and a SfM photogrammetry application.

FIG. 1 is a high-level block diagram of an example software architecture 100 that includes a computer aided design (CAD) environment and a SfM photogrammetry application. The CAD environment may be the Microstation® CAD environment available from Bentley Systems, Inc., while the SfM photogrammetry application may be the ContextCapture™ application available from Bentley Systems, Inc.

In one embodiment, the SfM photogrammetry application operates to generate a multi-resolution textured mesh based on a set of images (e.g., photographs) of the real-world captured by a camera or cameras (not shown) that represents a portion of the physical environment (e.g., one or more objects, structures, terrain, etc.). However, it should be understood that other forms of source data may additionally, or alternatively, be utilized. For example, source data may include data captured by LiDAR, RGB-D cameras, or other types of sensors. The sensors may be static, or mounted to mobile terrestrial or airborne platforms.

The CAD environment and SfM photogrammetry application 100 may be divided into local software 110 that executes on one or more computing devices local to an end-user (collectively "local devices") and cloud-based software 112 that is executed on one or more computing devices remote from the end-user (collectively "cloud computing devices"), accessible via a network (e.g., the Internet). Each computing device may include processors, memory, storage systems, and other hardware (not shown) for executing software and storing data. The local software 110 includes one or more frontend SfM photogrammetry clients 120 and a frontend portion of the CAD environment 130. The frontend SfM photogrammetry clients 120 and frontend portion of the CAD environment 130 may provide a variety of functions, including providing a graphical user-interface (GUI) for displaying, editing and analyzing the mesh. Such functions may be provided by a number of individual software processes of the frontend SfM photogrammetry clients 120 and frontend portion of the CAD environment 130, which may execute as individual threads. One such process may be a tile and contouring process 132 of the CAD environment 130, which obtains tiles and contours to provide a substantially real-time contour display. The tile and contouring process 132 may include a number of sub-processes, including a query subprocess 134, a display subprocess 136 and a computation subprocess 138. The tile and contouring process 132 may interact with a local cache 139 (e.g., in memory) to store already obtained tiles and contour lines. Operation of the tile and contouring process 132 is discussed in more detail below.

The cloud-based software 112 includes backend SfM photogrammetry clients 140 and a backend portion of the CAD environment 150. The backend SfM photogrammetry clients 140 and backend portion of the CAD environment 150 may perform a variety of operations, including certain resource intensive operations, such as reconstruction, texturing and annotating, as well as other processing intensive operations. Such operations may be performed by a number of individual software processes of the back end SfM photogrammetry clients 140 and backend portion of the CAD environment 150, which may execute as individual threads.

The frontend SfM photogrammetry clients 120 and the front portion of the CAD environment 130, and the backend SfM photogrammetry clients 140 and the backend portion of the CAD environment 150 may read and write to portions of the multi-resolution mesh in parallel. An infinite mesh services process 160 accesses the multi-resolution mesh. The infinite mesh services process 160 may include a number of subprocesses including a region of interest (ROI) locking and management process 162 that may maintain a region locking database 163, a tile computation engine 164 that computes, addresses and updates tiles that store portions of mesh data, and a file structure process 166 that organizes data of tiles for storage. It should be understood that the infinite mesh services process 160 may also include a large number of other subprocesses.

The subprocesses of the infinite mesh services process 160 may operate to store the mesh as tiles maintained in files 167. Such storage may be structured according to any of a number of data structures. In one implementation, the data structures may take the form of an octree.

Figure 2:
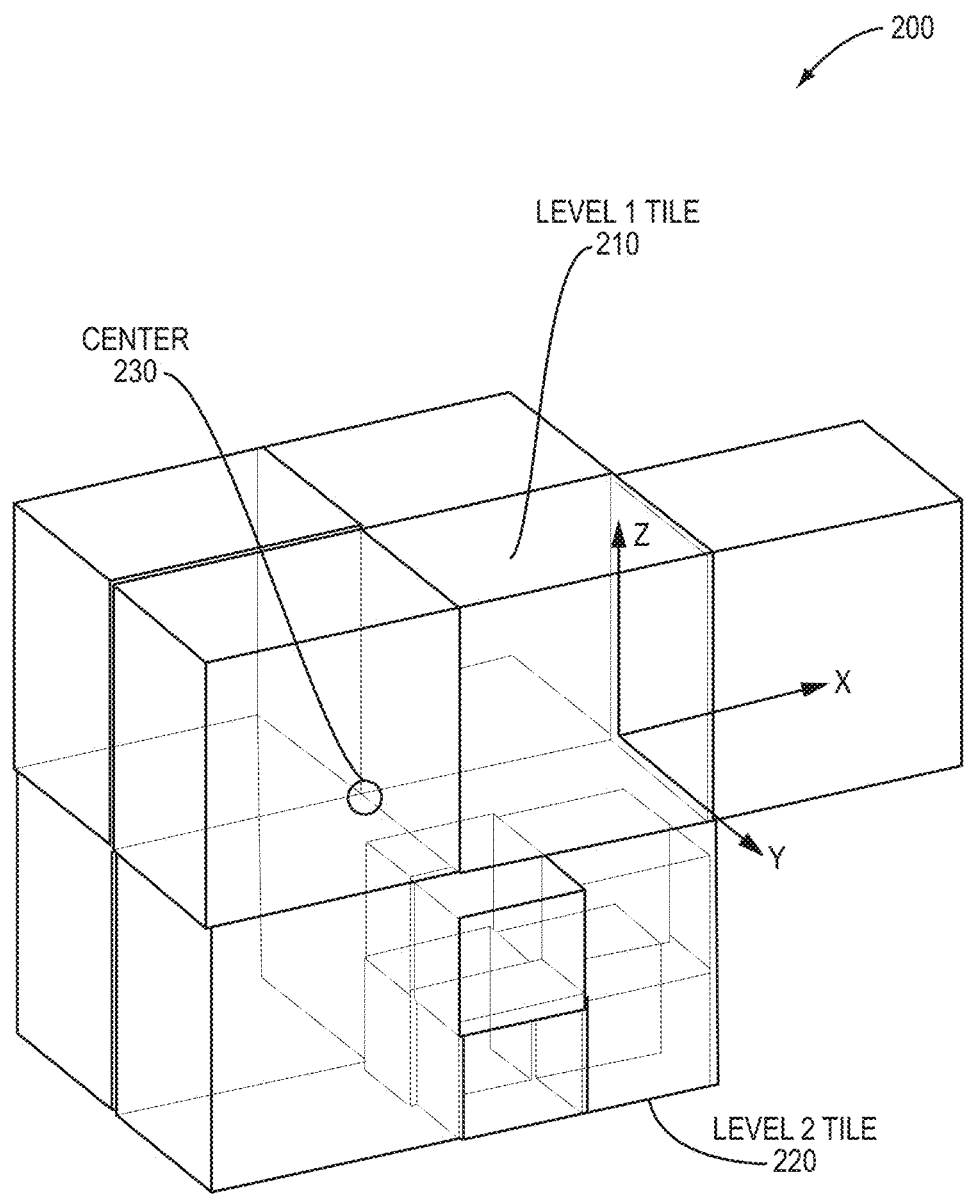
FIG. 2 is a diagram illustrating the use of tiles arranged in an octree.

FIG. 2 is a diagram 200 illustrating the use of tiles arranged in an octree. Each tile represents a region (e.g., in the case of a 3D mesh depicted here, a cubic region) in multi-dimensional space (e.g., in the case here, a 3D space) and is addressed by coordinates that represent an address of the tile. A parameter (I) may be associated with the tile to represent a level of the octree at which the tile is located. At each level below the highest level, tiles may be smaller (e.g., half the size in each dimension) than the tile immediately above, but represent the mesh at a higher resolution. For example, a tile 210 may have a level 1. A tile 220 at level 2 may be half the size in each dimension as tile 210, but represent space at a higher resolution. The center of the octree may be located at the bottom corner of the tile 230 on level 1. An encompassing tile at a level immediately above another tile in the octree may be referred to as a parent tile of such tile. Parent tiles and encompassing tiles at levels further above another tile may be referred to as an ancestor tile of such tile. An included tile at a level immediately below another tile in the octree may be referred to as a child tile. An independent tile at the same level as another tile that shares a parent may be referred to as a sibling tile.

Figure 3:
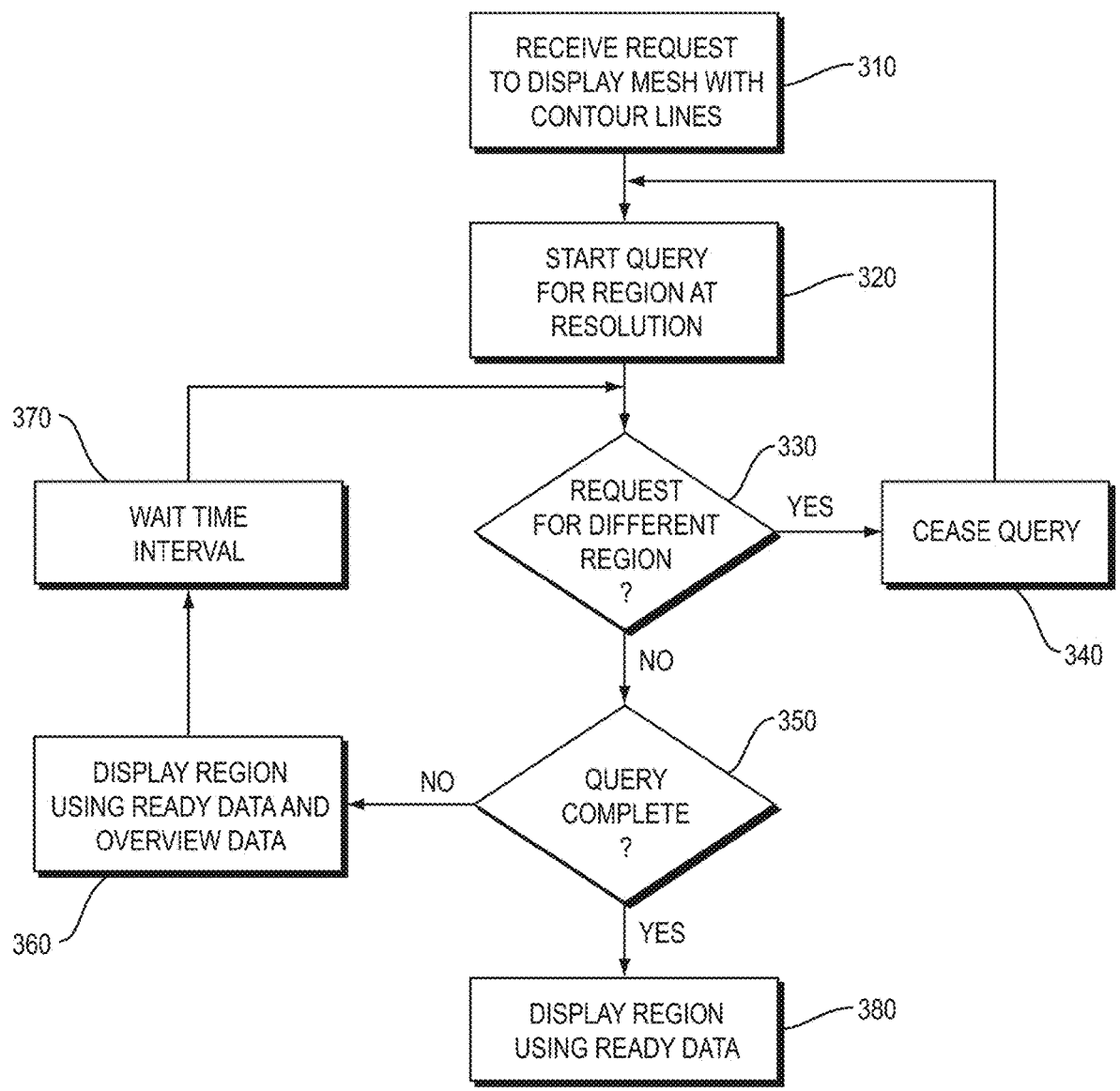
FIG. 3 is a flow diagram of an overall sequence of steps for displaying contour lines on a multi-resolution mesh substantially in real-time.

FIG. 3 is a flow diagram of an overall sequence of steps 300 for displaying contour lines on a multi-resolution mesh substantially in real-time. At step 310, a user request is received (e.g., as input in a GUI) to display a region of the multi-resolution mesh at a given resolution with contour lines. The multi-resolution mesh may have been previously generated by operation of SfM photogrammetry clients 120, 140. At step 320, the query subprocess 134 of the tile and contouring process 132 starts a query for the region at the given resolution. The query obtains tiles for the region and computes contour lines for those tiles. As discussed in more detail below, the mesh and contour lines from lower resolution tiles may be displayed as temporary (i.e. "overview") data while the mesh and contour lines for higher resolution tiles are obtained or computed, to enable substantially real-time update. While the query is executing, at step 330, the tile and contouring process 132 checks whether a request for a different (i.e. changed) region of the multi-resolution mesh has been received. In some cases, a user may desire a different view of the mesh while tiles and contour lines are still being obtained or computed (e.g., and overview data is being displayed). In such case it is desirable to cease operations for the old region so as to not unnecessarily expend hardware resources (e.g., memory and processing resources) on tiles that are no longer part of the current view. If the region has changed, execution proceeds to step 340, where the query subprocess 134 ceases the query and execution then loops back to step 330, where the query subprocess 134 starts a new query for the new region. If the region has not changed, execution proceeds to step 350, where the query subprocess 134 checks if the query is complete (i.e. all tiles have been obtained and all contour lines have been computed). If so, execution proceeds to step 380, where the display subprocess 136 of the tile and contouring process 132 displays the region of the multi-resolution mesh using the subset of tiles and contours yielded by the query. If not, execution proceeds to step 360, where the display subprocess 136 of the tile and contouring process 132 displays the region of the multi-resolution mesh using the subset of tiles and contours yielded by the query and overview data for those that are not yet available. At step 370, the tile and contouring process 132 waits a predetermined time interval, and then loops to step 330, repeating the check for whether the region has changed, and thereafter to step 350, where the query subprocess 136 repeats the check for whether the query is complete.

Figure 4:
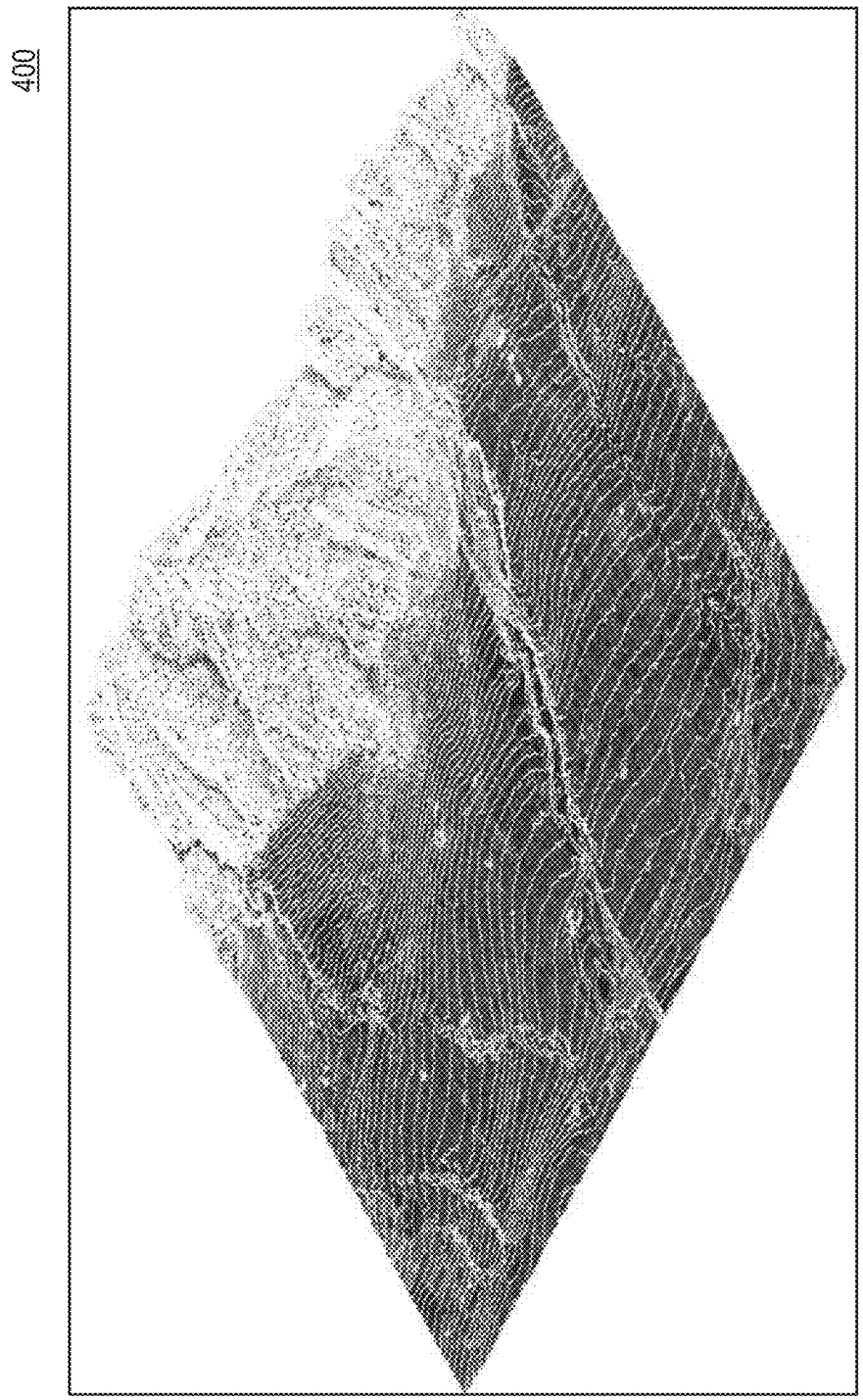
FIG. 4 is a view of an example 2.5-D mesh representing terrain that includes contour lines at every 5 meters in elevation, that may be displayed as part of a step of FIG. 3.
Figure 5:
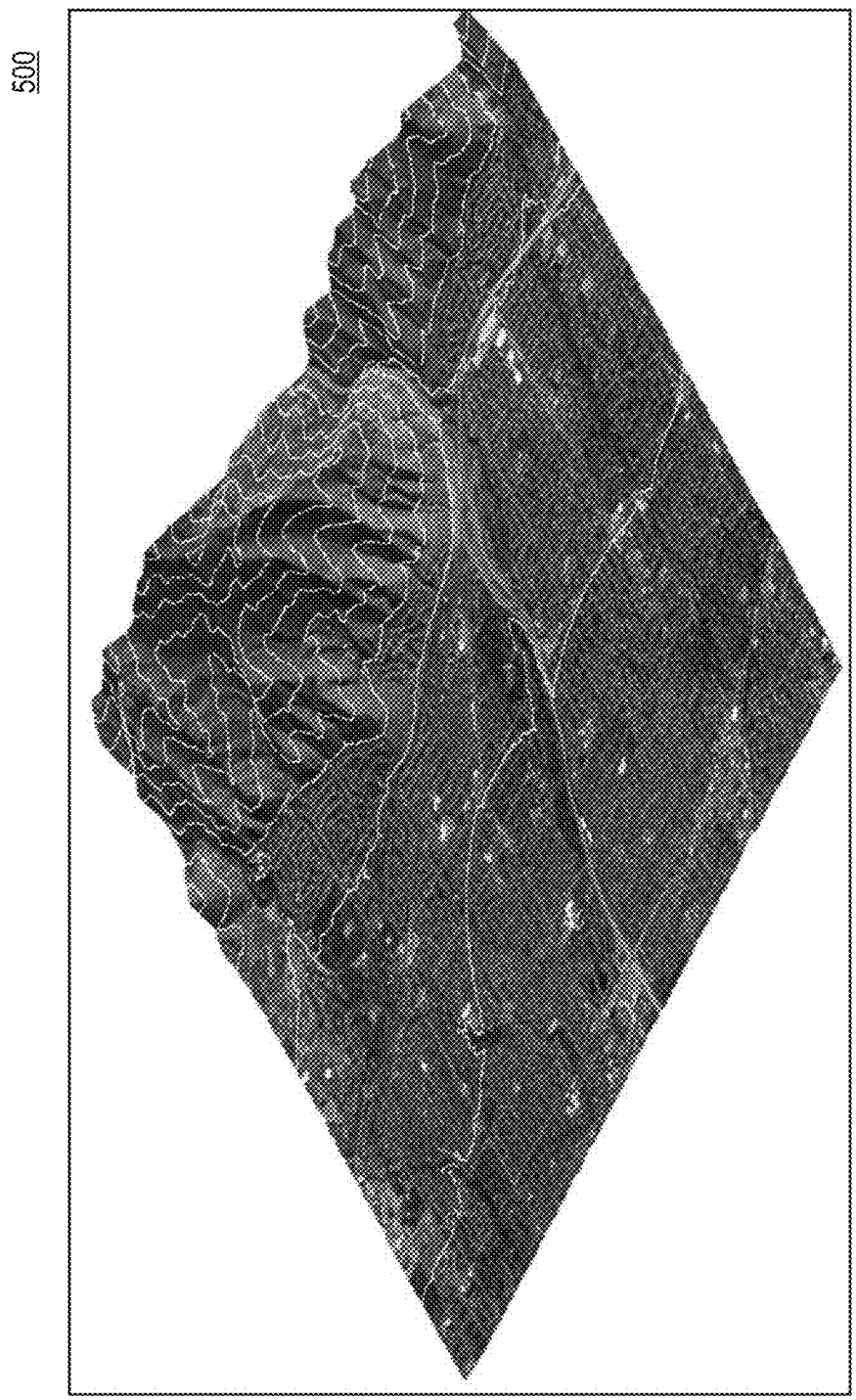
FIG. 5 is a view of the same example 2.5-D mesh representing terrain as FIG. 4 with contour lines at every 100 meters in elevation, that alternatively may be displayed as part of a step of FIG. 3.
Figure 6:
FIG. 6 is an enlarged (i.e. zoomed in) view of the same example 2.5-D mesh representing terrain that includes contour lines at every 5 meters in elevation as FIG. 4, that alternatively may be displayed as part of a step of FIG. 3.
Figure 7:
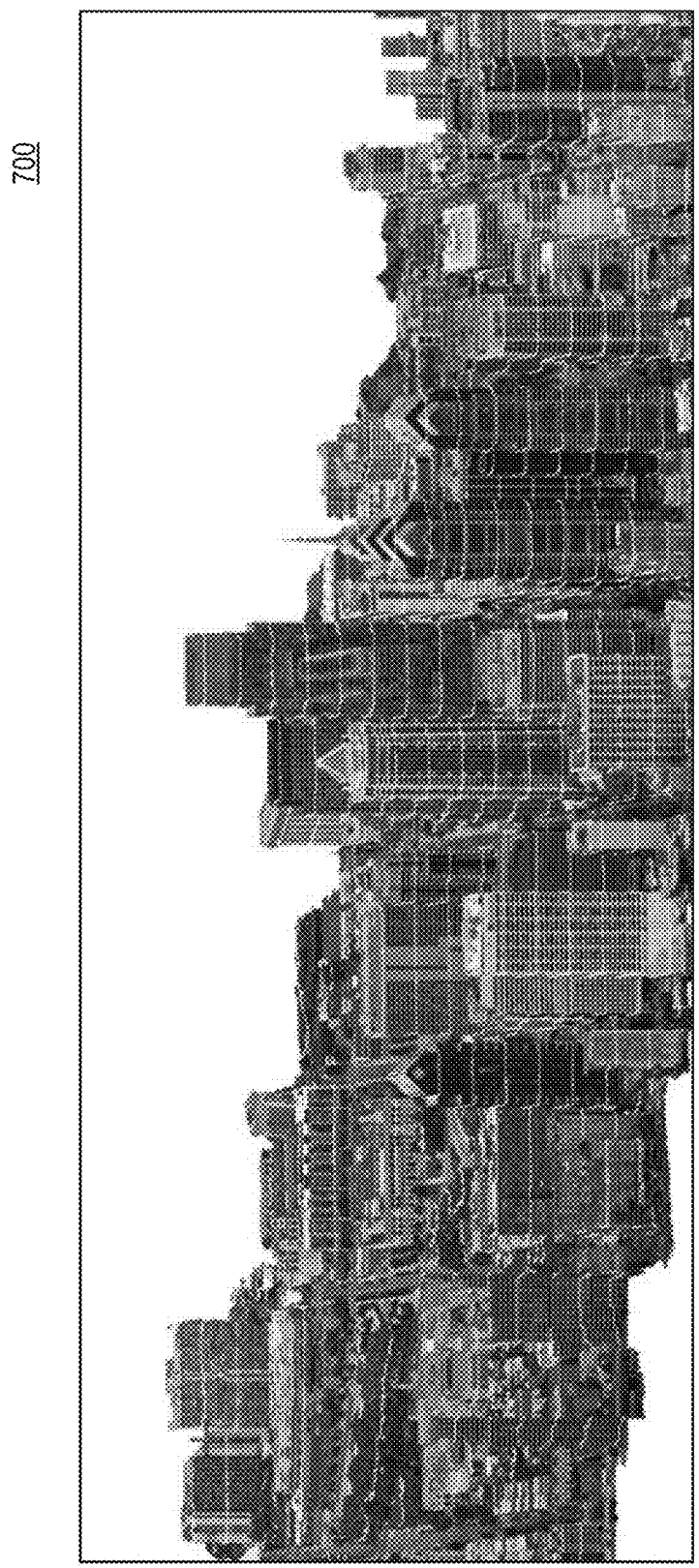
FIG. 7 is a view of an example 3-D mesh representing city buildings that includes contour lines at every 5 meters in height above a ground level plane, that may be displayed as part of a step of FIG. 3.
Figure 8:
FIG. 8 is an enlarged (i.e. zoomed in) view of the same example 3-D mesh representing city buildings that includes contour lines at every 5 meters in height above a ground level plane, that alternatively may be displayed as part of a step of FIG. 3.

FIG. 4 is a view 400 of an example 2.5-D mesh representing terrain that includes contour lines at every 5 meters in elevation, that may be displayed as part of step 360 of FIG. 3. FIG. 5 is a view 500 of the same example 2.5-D mesh representing terrain as FIG. 4 with contour lines at every 100 meters in elevation, that alternatively may be displayed as part of step 360 of FIG. 3. FIG. 6 is an enlarged (i.e. zoomed in) view of the same example 2.5-D mesh representing terrain that includes contour lines at every 5 meters in elevation as FIG. 4, that alternatively may be displayed as part of step 360. A view change from the view 400 in FIG. 4 the view 600 of FIG. 6 is an example of a change that may be detected as part of step 330 of FIG. 3, causing the current query to cease. It should be remembered that the multi-resolution mesh may represent items other than terrain (e.g., objects, structures, etc.) and contour lines may represent height changes above planes other than a plane representing sea level. FIG. 7 is a view 700 of an example 3-D mesh representing city buildings that includes contour lines at every 5 meters in height above a ground level plane, that may be displayed as part of step 360 of FIG. 3. FIG. 8 is an enlarged (i.e. zoomed in) view of the same example 3-D mesh representing city buildings that includes contour lines at every 5 meters in height above a ground level plane, that alternatively may be displayed as part of step 360.

Figure 9:
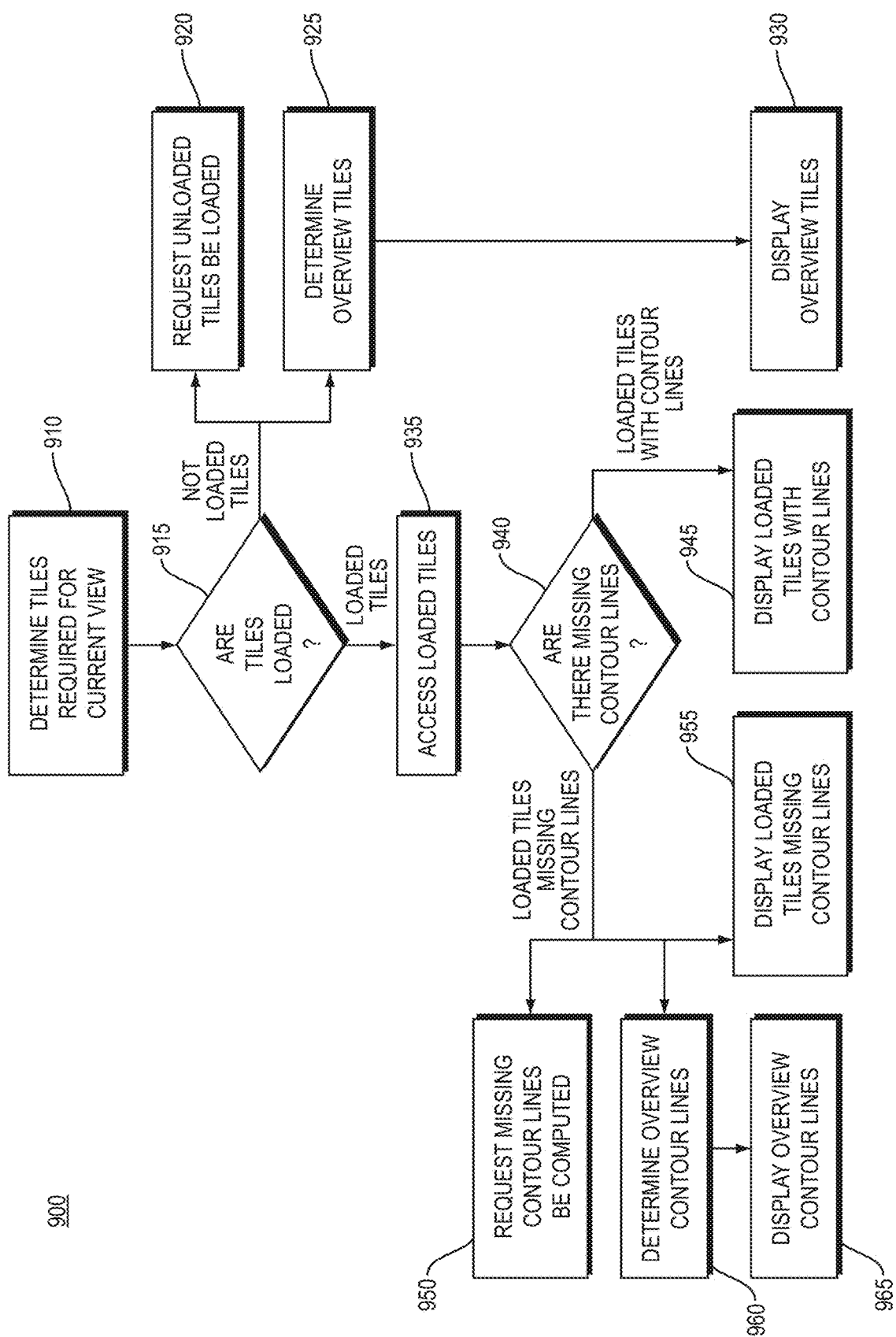
FIG. 9 is a flow diagram of a sequence of steps for performing a query for tiles and contour lines for a region of the multi-resolution mesh at a given resolution, that may be started as part of a step of FIG. 3.
Figure 10:
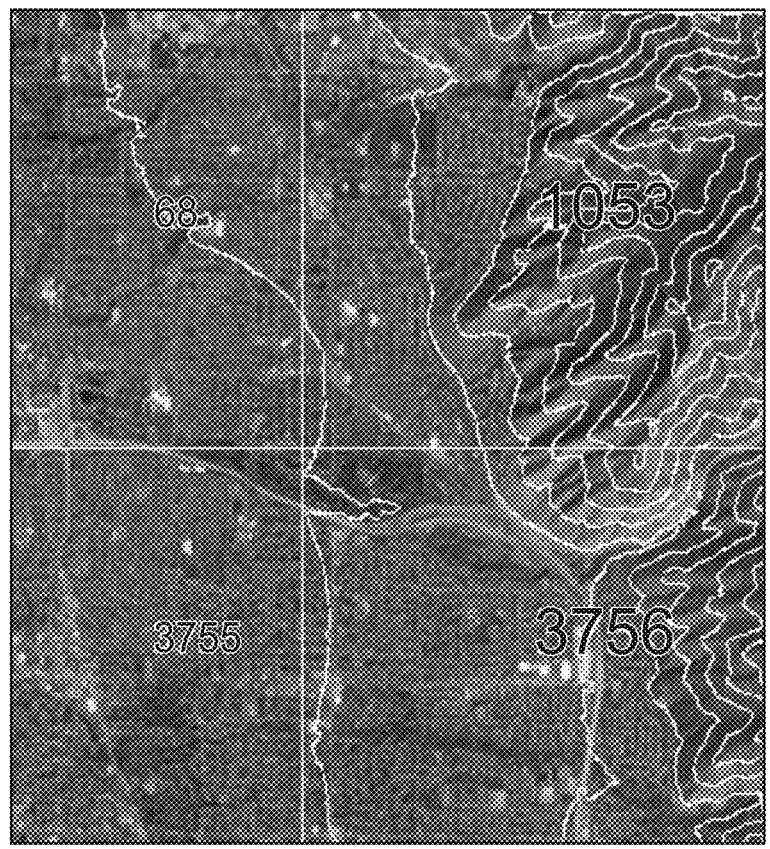
FIG. 10 is a view of a region of an example 2.5-D mesh representing terrain with contour lines at every 100 meters, illustrating four tiles (numbered 68, 1053, 3755 and 3756) whose data is required for a current view.

As mentioned above, to enable substantially real-time display of contour lines, contour lines may be computed on a per-tile basis and the mesh and computed contour lines from lower resolution tiles may be displayed as temporary ("overview") data while the mesh and contour lines for higher resolution tiles are obtained or computed. Such operations may be illustrated by considering the steps 300 of FIG. 3 in more detail. FIG. 9 is a flow diagram of steps 900 for performing a query for tiles and contour lines for a region of the multi-resolution mesh at a given resolution, that may be started as part of step 320 of FIG. 3. At step 910, the tile and contouring process 132 determines tiles required for the region visible in the current view (i.e. tiles whose partition of multi-dimensional space overlaps the region visible in the current view). FIG. 10 a view 1000 of a region of an example 2.5-D mesh representing terrain with contour lines at every 100 meters, illustrating four tiles (numbered 68, 1053, 3755 and 3756) whose data is required for a current view. It should remembered that only a portion of each of these tiles may be visible in the current view.

At step 915, the query subprocess 134 checks whether any of the required tiles are already in the local cache 134. If there are one or more unloaded tiles, execution proceeds to step 920, where the query subprocess 134 requests the one or more unloaded tiles to be loaded into the local cache 139. Further, at step 925, the tile and contouring process 132 determines lower resolution tiles ("overview" tiles) that include the area covered by the unloaded tiles and the query subprocess 136 accesses them from the local cache 134. Then, at step 930, the display subprocess 136 displays a portion of the lower resolution tiles. It should be understood that depending on display settings, steps 925 and 930 may not always be required. For example, if display settings have been set such that contour lines are to be displayed but not the mesh itself, steps 925 and 930 may be skipped.

Returning to step 915, if there are one or more required tiles already loaded in the local cache 134, the loaded tiles are accessed by the query subprocess 136 at step 935, and, at step 940, the tile and contouring process 132 determines if any of them have missing contour lines. If there are one or more loaded tiles that are not missing counter lines, at step 945, the display subprocess 136 displays the tiles with their respective contour lines from the local cache 139. If there are one or more loaded tiles that have missing contour lines, at step 950, the query subprocess 134 requests missing contour lines be computed and stored in the local cache 139, and at step 955, the loaded tiles with missing contour lines are displayed. In parallel, the tile and contouring process 132, at step 960, determines lower resolution contour lines (i.e. "overview" contour lines) that fall within the area covered by the loaded tile, and the query subprocess 134 accesses them from the local cache 134. Then, at step 965, the display subprocess 137 displays the lower resolution contour lines overlaid upon the loaded tiles with missing contour lines.

Figure 11:
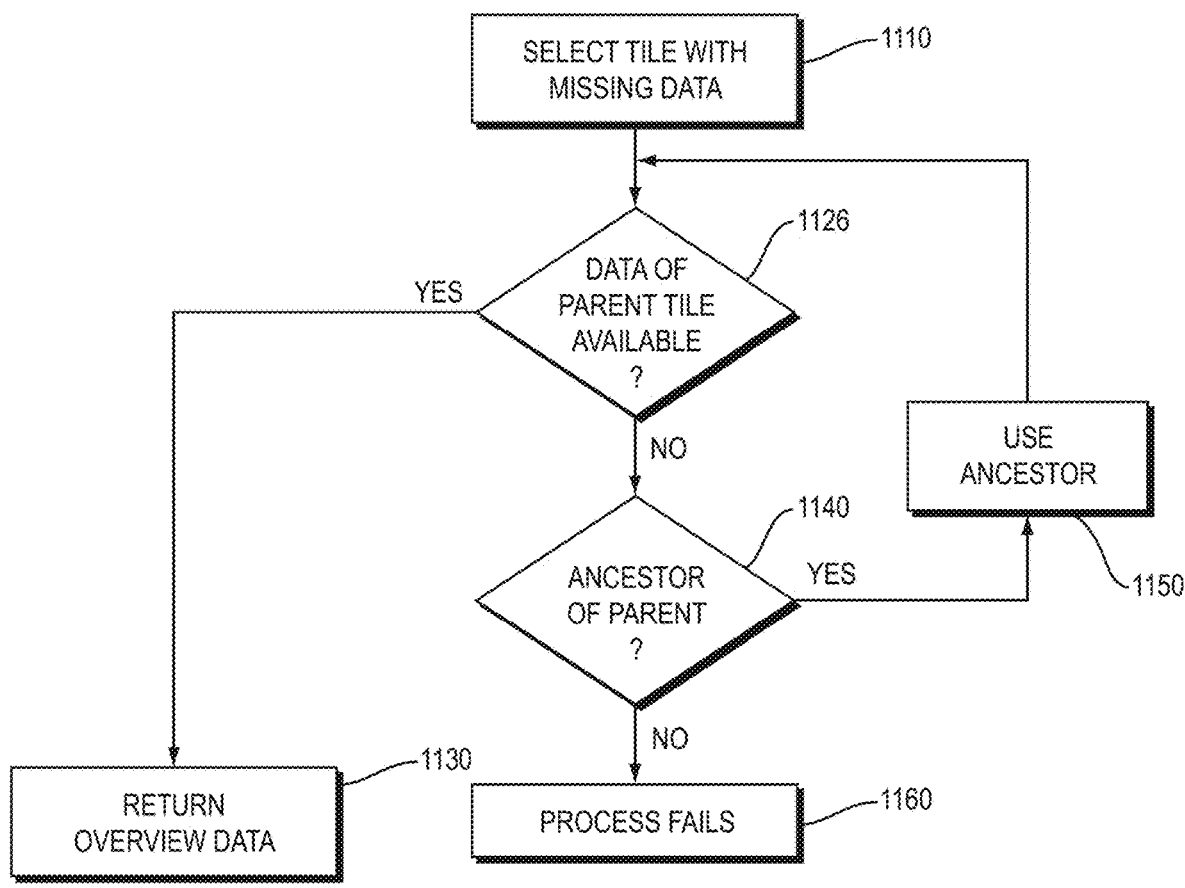
FIG. 11 is a flow diagram of a sequence of steps for determining lower resolution (i.e. "overview") tiles and contour lines (collectively referred to as "overview" data) that may be performed as part of steps of FIG. 9.

FIG. 11 is a flow diagram of a sequence of steps 1100 for determining lower resolution (i.e. "overview") tiles and contour lines (collectively referred to as "overview" data) that may be performed as part of steps 925 and 960 of FIG. 9. At step 1110, the tile and contouring process 132 selects a tile with missing data (e.g., either the tile being unloaded or loaded but missing contour lines) and loads metadata describing the tile. At step 1120, the query subprocess 134 determines if data of the parent tile of the selected tile is available in the local cache 139. If so, at step 1130, the query subprocess 134 accesses and returns the overview data of the parent tile from the local cache 134. If not, at step 1040, the tile and contouring process 132 determines whether the parent itself has a parent tile (referred to as an "ancestor" tile). If so, the ancestor tile is used as the parent tile, at step 1150, and execution loops to step 1120, where the query subprocess 134 determines if data of the parent tile is available in the local cache 134. If not, the sequence of steps terminates at step 1160, failing to find lower resolution ("overview") data. It should be understood that an implementation may be structured such that step 1160 rarely, if ever, is reached.

Figure 12:
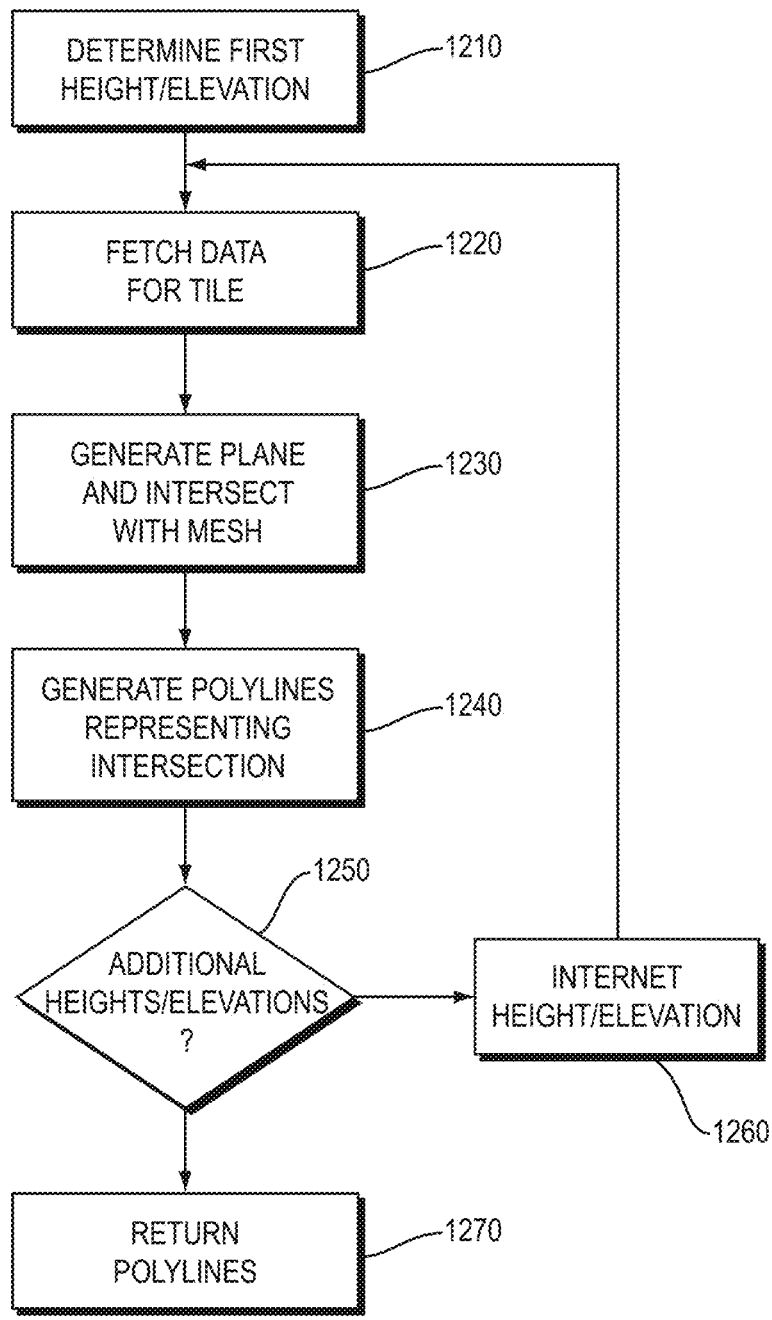
FIG. 12 is a flow diagram of a sequence of steps for computing contour lines for a tile that may be performed as part of a step of FIG. 9.

FIG. 12 is a flow diagram of a sequence of steps 1200 for computing contour lines for a tile that may be performed as part of step 950 of FIG. 9. At step 1210, the computation subprocess 138 of the tile and contouring process 132 determines a first height or elevation for the tile. The first height or elevation ($E_0$) may be computed based on a minimum vertical content value ($Z_{min}$) that describes a lowest height or elevation above a plane for which there is data in the tile and an elevation gap (G) that describes the spacing of contour lines desired. An example formula for determining the first height or elevation may be give as:

$$E_0 = (G \cdot (Z_{min} \% G)) + Z_{min}$$

where % is a modulo operation.

At step 1220, the computation subprocess 136 fetches the data for the tile from the local cache 139 or from persistent storage (e.g., a local storage device, cloud-based storage, etc.). At step 1230, the computation subprocess 138 generates a horizontal plane at the current elevation and intersects this plane with the mesh data. At step 1240, based on the intersection of the plane with the mesh data, the computation subprocess 138 generates polylines representing the intersection. At step 1250, the computation subprocess 138 checks whether there are additional height or elevation levels ($L_n$) to process based on a maximum vertical content value ($Z_{max}$) that describes a highest height or elevation above a plane for which there is data in the tile. Stated mathematically, additional height or elevation levels ($L_n$) are available when:

$$E_0 + G * L_n < Z_{max}$$

If there are additional heights or elevations to process, execution proceeds to step 1260, where the height or elevation is incremented by the elevation gap (G), and execution loops back to step 1220. If there are no additional heights or elevations to process, the computation subprocess 138 returns all the generated polylines as contours for the tile.

It should be understood that various adaptations and modifications may be readily made to what is described above, to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for displaying contour lines on a multi-resolution mesh, comprising:

determining, by one or more software processes executing on one or more computing devices, tiles required for a region visible in a current view of the multi-resolution mesh;

determining one or more of the required tiles are available in a local cache but are missing contour lines;

requesting, by the one or more software processes, computation of the missing contour lines for the one or more tiles with missing contour lines;

accessing lower resolution contour lines that fall within an area covered by the one or more tiles with missing contour lines from a lower resolution tile available in the local cache; and displaying the lower resolution contour lines on the one or more tiles with missing contour lines while the missing contour lines are being computed.

2. The method of claim 1, further comprising:

determining at least one of the required tiles is available in a local cache with contour lines; and displaying the at least one tile with contour lines.

3. The method of claim 1, further comprising:

determining one or more of the required tiles is not available in the local cache;

requesting, by the one or more software processes, the one or more tiles that are not available in the local cache;

accessing a second lower resolution tile that is a parent of the one or more tiles that are not available in the local cache; and displaying a portion of the second lower resolution tile while the one or more tiles that are not available in the local cache are being loaded.

4. The method of claim 1, further comprising:

determining the current view of the multi-resolution mesh has changed;

stopping the requesting computation of the missing contour lines; and repeating the determining tiles required for a new region visible in the changed view.

5. The method of claim 1, wherein the tiles are arranged in a tree structure and the lower resolution tile is a parent tile of the one or more tiles with missing contour lines in the tree structure.

6. The method of claim 5, wherein the tree structure is an octree.

7. The method of claim 1, further comprising:

computing the missing contour lines for the one or more tiles with missing contour lines by, for each of a plurality of heights or elevations, intersecting a plane at the heights or elevations with mesh data from the one or more tiles, generating polylines based on the intersection, and adding the generated polylines to a set that is returned as contours lines for the one or more tiles.

8. The method of claim 1, wherein the multi-resolution mesh represents a portion of the physical environment and is generated through structure from motion (SfM) photogrammetry.

9. A computing device comprising:

a processor; and a memory coupled to the processor and configured to store one or more software processes that when executed are operable to:

determine tiles required for a region visible in a current view of a multi-resolution mesh, if a required tile is available in a local cache with contour lines, display the tile with contour lines from the local cache, and if a required tile is available in a local cache but is missing contour lines, request computation of the missing contour lines for the tile with missing contour lines, access lower resolution contour lines that fall within an area covered by the tile with missing contour lines from a lower resolution tile available in the local cache, and display the lower resolution contour lines on the tile with missing contour lines while the missing contour lines are being computed.

10. The computing device of claim 9, wherein the one or more software processes are further operable to:
   if a required tile is not available in the local cache, request the tile not available in the local cache, access a second lower resolution tile that is a parent of the tile not available in the local cache, and display a portion of the second lower resolution tile while the tile not available in the local cache is being loaded.

11. The computing device of claim 9, wherein the one or more software processes are further operable to:
   determine the current view of the multi-resolution mesh has changed,
   stop any requests for computation of missing contour lines, and
   repeat the determination of tiles required for a new region visible in the changed view.

12. The computing device of claim 9, wherein the tiles are arranged in a tree structure and the lower resolution tile is a parent tile of a tile with missing contour lines in the tree structure.

13. The computing device of claim 12, wherein the tree structure is an octree.

14. The computing device of claim 9, wherein the one or more software processes are further operable to:
   compute the missing contour lines for the tile with missing contour lines by, for each of a plurality of heights or elevations, intersecting a plane at the heights or elevations with mesh data from the tile, generating polylines based on the intersection, and adding the generated polylines to a set that is returned as contours lines for the tile.

15. The computing device of claim 9, wherein the multi-resolution mesh represents a portion of the physical environment and is generated through structure from motion (SfM) photogrammetry.

16. A non-transitory electronic-device readable medium having instructions stored thereon, the instructions when executed by one or more electronic devices operable to:
   determine tiles required for a region visible in a current view of the multi-resolution mesh;
   determine one or more of the required tiles is available but are missing contour lines;
   request computation of the missing contour lines for the one or more tiles with missing contour lines;
   access lower resolution contour lines that fall within an area covered by the one or more tiles with missing contour lines from an available lower resolution tile; and
   display the lower resolution contour lines on the one or more tiles with missing contour lines while the missing contour lines are being computed.

17. The non-transitory electronic-device readable medium of claim 16, wherein the instructions when executed are further operable to:
   determine at least one of the required tiles is available with contour lines; and
   display the at least one tile with contour lines.

18. The non-transitory electronic-device readable medium of claim 16, wherein the instructions when executed are further operable to:
   determine one or more tiles of the required tiles that are not available;
   request the one or more tiles that are not available;
   access a second lower resolution tile that is a parent of the one or more tiles that are not available; and
   display a portion of the second lower resolution tile while the one or more tiles that are not available tile are being loaded.

19. The non-transitory electronic-device readable medium of claim 16, wherein the instructions when executed are further operable to:
   determine the current view of the multi-resolution mesh has changed;
   stop the operation to request computation of the missing contour lines; and
   repeat the operation to determine tiles required for a new region visible in the changed view.

20. The non-transitory electronic-device readable medium of claim 16, wherein the tiles are arranged in a tree structure and the lower resolution tile is a parent tile of the one or more tiles with missing contour lines in the tree.

* * * * *